US006449313B1

(12) United States Patent
Erzin et al.

(10) Patent No.: US 6,449,313 B1
(45) Date of Patent: Sep. 10, 2002

(54) SHAPED FIXED CODEBOOK SEARCH FOR CELP SPEECH CODING

(75) Inventors: Engin Erzin, Edison; Michael C. Recchione, Nutley, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/300,314

(22) Filed: Apr. 28, 1999

(51) Int. Cl.[7] .......................... H04L 27/00; G10L 21/00
(52) U.S. Cl. ........................................ 375/259; 704/219
(58) Field of Search ................................. 375/259, 282, 375/260; 704/219, 221, 225, 262, 223, 244

(56) References Cited

U.S. PATENT DOCUMENTS 5,903,853 A * 5/1999 Sano .......................... 455/550
5,950,155 A * 9/1999 Nishiguchi .................. 704/219
5,982,817 A * 11/1999 Wuppermann ............... 341/76
6,144,935 A * 11/2000 Chen et al. ................. 704/220
6,249,758 B1 * 6/2001 Mermelstein ............... 704/214

OTHER PUBLICATIONS

W. B. Kleijn et al., "Speech Coding and Synthesis," 1995, Elsevier, pp 89–90.

* cited by examiner

*Primary Examiner*—Chi Pham
*Assistant Examiner*—Khai Tran
(74) *Attorney, Agent, or Firm*—Harness, Dickey & Pierce, P.L.C.

(57) ABSTRACT

A fixed codebook response is able to better characterize an input signal of a vocoder because the entries of the fixed codebook are tailored to the input signal being processed. A uniformly distributed random noise signal is stored in a transmitting vocoder. During encoding by the transmitting vocoder, the noise signal is shaped by a weighing filter and a pitch sharpening filter, which are condition controlled by the linear predictive coding, pitch and pitch gain characteristics of the input signal being encoded. The shaped noise signal is passed though a thresholding filter to arrive at a pulse sequence having a given sparcity. The fixed codebook response is chosen as that portion of the pulse sequence which best matches a residual signal of the input signal. The indexed location of that portion along the pulse sequence is designated as the fixed codebook bits which are included within the bit frame. The identical random noise signal is stored in a receiving vocoder. The linear predictive coding, pitch, and pitch gain characteristics are part of the bit frame, and are again used to produce an identical pulse sequence. The fixed codebook bits of the bit frame are used to index the pulse sequence to the best matching portion, and hence the fixed codebook response for the bit frame.

20 Claims, 8 Drawing Sheets

SHAPED FIXED CODEBOOK SEARCH FOR CELP SPEECH CODING

BACKGROUND ART

1. Field of the Invention

The present invention relates to vocoders, and more particularly to the representation of the fixed codebook response generated thereby.

2. Description of the Background Art

FIGS. 1 and 2 illustrate transmitting and receiving units of a code excited linear prediction (CELP) vocoder, in accordance with the background art. In FIG. 1, the transmitting unit is a first vocoder 1. The first vocoder 1 includes a linear predictive coding (LPC) filter 2. The LPC filter 2 is connected a perceptual weighing filter 3 via a junction 4. The perceptual weighing filter 3 is connected to an error minimization filter 5. The error minimization filter 5 is connected to a first adaptive codebook 6 and a first fixed codebook 7. The first adaptive codebook 6 is connected to a first adaptive codebook gain unit 8. The first fixed codebook 7 is connected to a first fixed codebook gain unit 9. The outputs of the first adaptive codebook gain unit 8 and the first fixed codebook gain unit 9 are connected at a junction 10. The junction 10 is connected to the junction 4.

Generally, the first vocoder 1 sequentially analyzes time segments of a digital speech input. Each time segment is referred to as a signal frame. The vocoder 1 estimates parameters characterizing each signal frame. The parameters are represented by bit patterns, which are assembled into a bit frame. The bit frames can be transmitted more quickly, or stored in less memory, than the signal frames which they represent.

Now, with reference to FIG. 1, a general description of the operation of a known IS127 EVRC CDMA type coder (vocoder 1) will be given. For more detail on the operation of the vocoder 1, reference can be made to textbooks relating to digital speech coding. The vocoder 1 is a multi-rate vocoder and has a full rate of operation corresponding to 8 kilo bits per second (kbps) and a half rate of operation corresponding to 4 kbps. The digital speech input is divided into signal frames of 20 msec. Each signal frame is further divided into first, second, and third sub-frames of approximately 6.6 msec.

When the vocoder 1 operates at full rate, a signal frame passes through the LPC filter 2, which extracts LPC parameters characterizing the entire signal frame and outputs the LPC parameters in the form of twenty-eight LPC bits. The signal frame leaves the LPC filter, passes through the junction 4, the perceptual weighing filter 3, and the error minimization filter 5. The perceptual weighing filter 3 and the error minimization filter 5 do not extract parameter bits from the signal frame, but prepare it for later processing.

Next, the signal frame is received by the first adaptive codebook 6. The first adaptive codebook 6 estimates a pitch for the entire frame, and outputs seven ACB bits characterizing the pitch of the entire frame. Then, the first adaptive codebook gain unit 8 estimates an adaptive codebook gain of the first sub-frame, the second sub-frame, and the third sub-frame. Three ACBG bits estimate the adaptive codebook gain of the first sub-frame. Three more ACBG bits estimate the adaptive codebook gain of the second sub-frame. And, still three more ACBG bits estimate the adaptive codebook gain of the third sub-frame.

Next, the signal passes through the junction 10, the junction 4, the perceptual weighing filter 3, and the error minimization filter 5, and is received by the first fixed codebook 7. The first fixed codebook 7 estimates the random, unvoiced characteristics of the first sub-frame, the second sub-frame, and the third sub-frame. Thirty-five FCB bits represent the fixed codebook response for the first sub-frame. Thirty-five more FCB bits represent the fixed codebook response for the second sub-frame. And, still thirty-five more FCB bits represent the fixed codebook response for the third sub-frame.

Next, the first fixed codebook gain unit 9 estimates a fixed codebook gain of the first sub-frame, the second sub-frame, and the third sub-frame. Five FCBG bits estimate the fixed codebook gain of the first sub-frame. Five more FCBG bits estimate the fixed codebook gain of the second sub-frame. And, still five more FCBG bits estimate the fixed codebook gain of the third sub-frame.

At this point, all of the bit patterns (LPC, ADC, ADCG, FCB, FCBG) are assembled into the bit frame. The bit frame, representing the signal frame, is complete and can be transmitted to a second vocoder 11 for synthesis, or stored in a memory for later retrieval. The above process sequentially repeats itself for each signal frame of the digital speech input.

FIG. 2 illustrates a decoding section of the second vocoder 11 for synthesizing the bit frames. The second vocoder 11 includes a second adaptive codebook 12, a second fixed codebook 13, a second adaptive codebook gain unit 14, a second fixed codebook gain unit 15, and a synthesis filter 16. The second vocoder 11 receives the LPC bits, ACBG bits, ACB bits, FCB bits, and FCBG bits. These bits are used by the second vocoder 11 to reconstruct an estimate of the original signal frame, in a manner well known in the art.

The total number of bit positions within the bit fame allocated to the various parameters, as given above, relate to the vocoder 1 (IS127 EVRC CDMA coder) operating at a full rate of 8 kbps. To summarize, the bit frame would include: 28 LPC bits; 7 ADC bits; 3+3+3=9 ACBG bits; 35+35+35=105 FCB bits; and 5+5+5=15 FCBG bits. Therefore, the total number of bits in the bit frame would be 164 bits.

As mentioned above, the vocoder 1 is a multi-rate vocoder, and the half rate of the vocoder 1 is 4 kbps. When the vocoder 1 operates at the half rate, it is no longer possible to transmit bit frames having a size of one hundred and sixty-four bit positions, while still keeping up with an incoming digital speech input, in real time. Instead, the bit frame size must be reduced to approximately eighty bit positions.

When the vocoder 1 (IS127 EVRC CDMA coder) operates at its half rate (4 kbps), the bit position are rationed in the following order: 22 LPC bits; 7 ACB bits; 3+3+3=9 ACBG bits; 10+10+10=30 FCB bits; and 4+4+4=12 FCBG bits. Therefore, the total number of bits in the bit frame would be 80 bits. It can be seen that the FCB bits suffer the predominate share of the bit frame's reduction in size.

Since the present invention concerns the fixed codebook, a brief summary of the operation of the fixed codebook computation in the vocoder 1 is in order. In the full rate (8 kbps), the one hundred and five bit positions allocated toward representing the fixed codebook response for the frame have the ability of placing eight estimation pulses in each of the three sub-frames. Graphically this is represented in FIG. 3.

In FIG. 3, a first signal line 17 is illustrative of a second residual signal presented to the fixed codebook 7 for estimation. The first sub-frame 18 is divided into fifty-three sample points, the second sub-frame 19 is also divided into fifty-three sample points, and the third sub-frame 20 is divided into fifty-four sample points.

In order to best estimate the characteristics of the second residual signal on signal line 17, positive and/or negative pulses 21 are located at select ones of the sample points. For example, second signal line 22 illustrates the polarities and placements of the pulses 21, in estimating the second residual signal of first signal line 17. The placements and polarities are the data characterized by the FCB bits for each of the sub-frames 18, 19, 20. In other words, for each sub-frame, the fixed codebook 7 estimates the best placement of eight to ten pulses 21 to represent the second residual signal of the first signal line 17, and the FCB bits for that sub-frame identify the placements and polarities of the pulses 21.

When the second vocoder 11 receives the FCB bits, an envelope 23 can be mathematically constructed based upon the placement of the positive and negative pulses 21 in order to provide an estimation to the second residual signal of the first signal line 17. Graphically this is illustrated on third signal line 24. Of course, the FCBG bits of each of the sub-frames would influence the amplitude of the peaks and valleys of the envelope 23 within the respective sub-frames, so that the amplitudes of the peaks and valleys of the envelope 23 match the average amplitude of the actual peaks and valleys within the second residual signal.

When the vocoder 1 operates at full rate (8 kbps), the one hundred and five bit positions within the bit frame, allocated to the fixed codebook response, can represent the positions and polarity of eight pulses per sub-frame, as illustrated by the second and third signal lines 22 and 24. When the vocoder 1 operates at half rate (4 kbps), the thirty bit positions within the frame, allocated to the fixed codebook response, can only represent the positions and polarity of three pulses per sub-frame.

A fourth signal 25 illustrates the placement of the positive and negative pulses 21' when the vocoder 1 operates at its half rate and the envelope 23' constructed mathematically in accordance with the placement of the pulses 21'. It can clearly be seen that the envelope 23' developed during the half-rate of operation does not approximate the second residual signal of the first signal line 17, nearly as well as, the envelope 23 developed when the vocoder 1 operates at its full rate.

It has been observed that the first and second vocoders 1, 11 process digital speech with sufficient reproduction quality when a medium to high bit rate is used during transmission of the bit frames (e.g. 4.8 kbps to 16 kbps). However, when bit rates are below 4.8 kbps (such as the 4 kbps rate, corresponding to the half-rate), the quality of the synthesized speech suffers greatly. The poor quality is primarily due to the inaccurate representation of the fixed codebook response of the sub-frames, as illustrated by the fourth signal line 25 in FIG. 3.

The poor representation is the result of the limited number of bits (e.g. thirty bits) allocated within the bit frame to represented the fixed codebook response of all of the sub-frames. Since the bit frame size cannot be increased when the bit rate is low, there exists a need in the art for a vocoder, and method of operating a vocoder, which can more accurately represent a fixed codebook response of a signal frame, or sub-frames, while doing so with a limited number of bit positions within the bit frame.

SUMMARY OF THE INVENTION

A vocoder, in accordance with the present invention, includes a fixed codebook having a plurality of entries of pulse sequences for comparison to a residual signal of the signal frame or sub-frame. The entries of the fixed codebook are tailored to the signal frame or sub-frame being encoded. A noise signal is stored in a transmitting vocoder. During encoding, the noise signal is shaped by filtering dependent upon determined parameters which characterize the signal frame or sub-frame. The shaped noise signal is passed though a thresholding filter to arrive at a pulse sequence. The fixed codebook response is chosen as that portion (i.e. entry) of the pulse sequence which best matches the residual signal of the signal frame or sub-frame. The indexed location of that portion is designated as the fixed codebook bits which are included within the bit frame. An identical noise signal is also stored in a decoding vocoder. The same active filtering and threshold filtering are applied to the identical noise signal to arrive at a same pulse sequence. Therefore, the fixed codebook bits, of the bit frame, will index the proper portion of the pulse sequence which represents the fixed codebook response to be used during synthesis.

BRIEF DESCRIPTION OF THE DRAWINGS

The present invention will become more fully understood from the detailed description given hereinbelow and the accompanying drawings which are given by way of illustration only, and thus are not limitative of the present invention. In the Figures, like elements have been assigned the same reference numerals.

DETAILED DESCRIPTION OF THE PREFERRED EMBODIMENT

Figure 4:
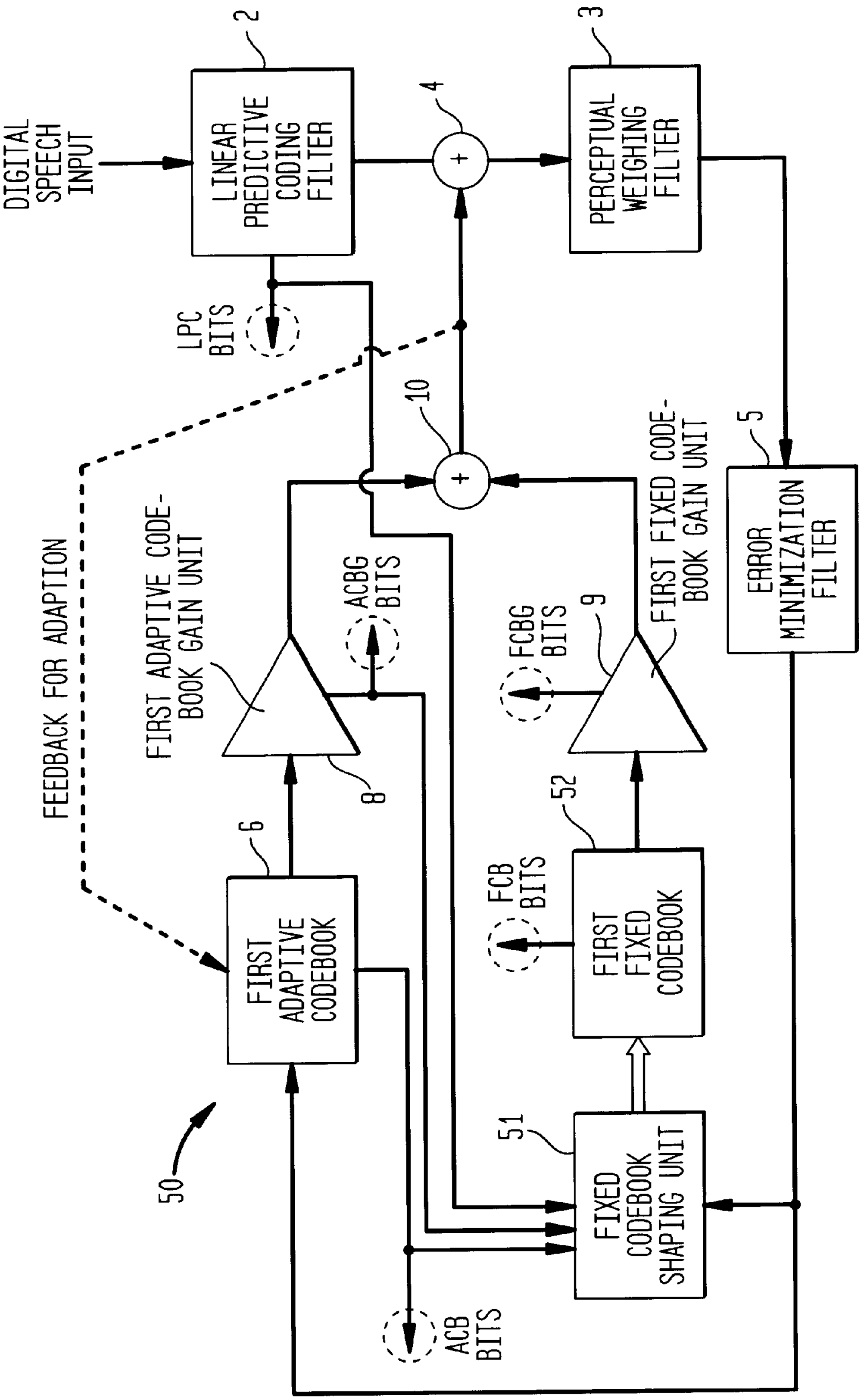
FIG. 4 illustrates a transmitting vocoder, in accordance with the present invention.

FIG. 4 illustrates a transmitting, first vocoder 50, in accordance with the present invention. The vocoder 50 includes the LPC filter 2; the perceptual weighing filter 3; the error minimization filter 5; the first adaptive codebook 6; the first adaptive codebook gain unit 8; and the first fixed codebook gain unit 9. Of particular interest is the first fixed codebook shaping unit 51 and the modified, first fixed codebook 52, in accordance with the present invention. The first fixed codebook shaping unit 51 is connected to the first fixed codebook 52, and receives inputs including the LPC bits, ACB bits, and ACBG bits.

The method of operation of the first vocoder 50 corresponds to the method described above except in relation to the fixed codebook response estimations. When the first sub-frame 18 is being estimated, instead of determining the best placement of three pulses 21', the second residual signal (signal line 17) is compared to a plurality of possible pulse sequences to determine which one of the pulse sequences best matches the second residual signal.

Figure 5:
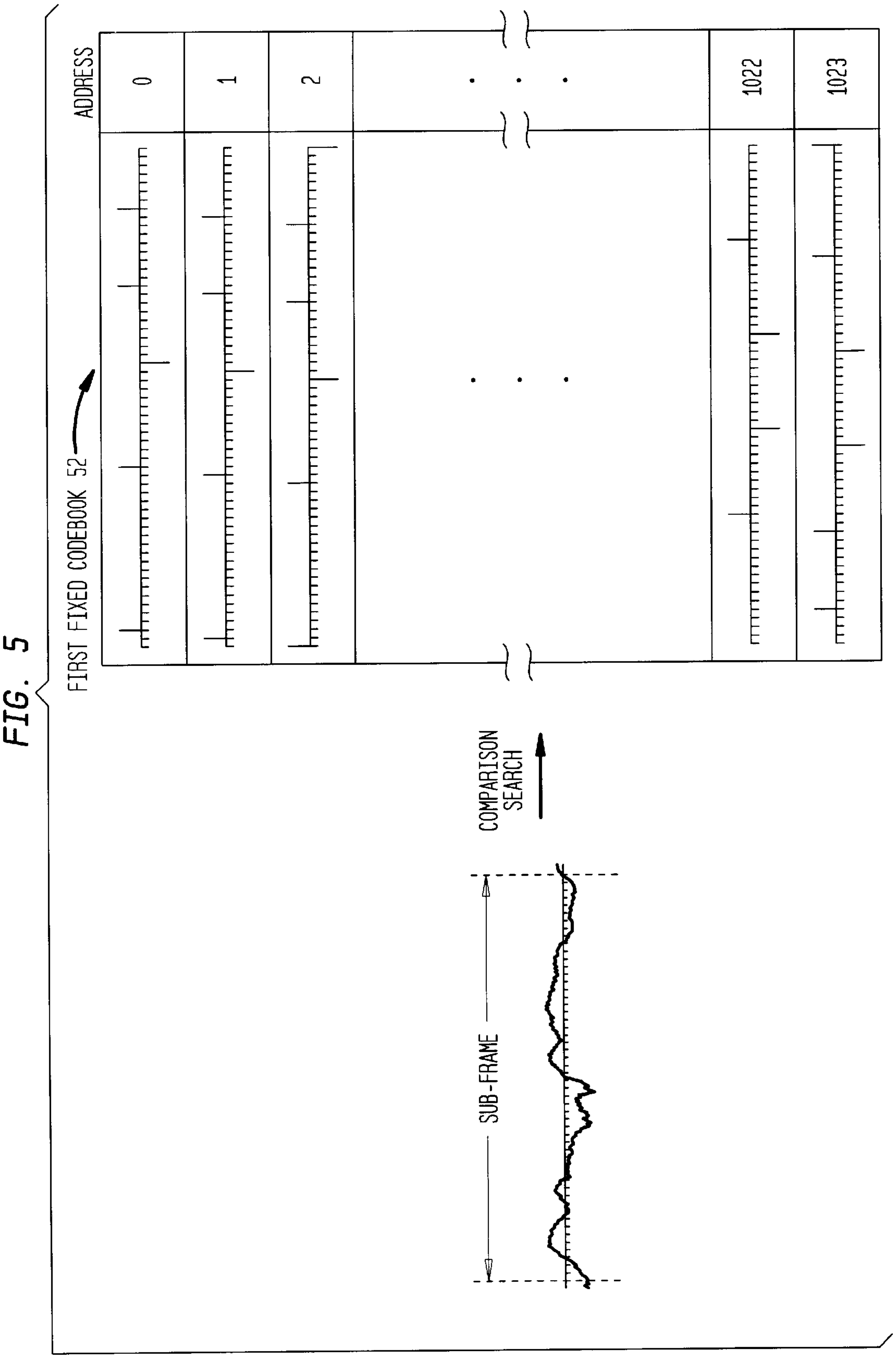
FIG. 5 illustrates a comparison of a second residual signal to various pulse sequences to determine a fixed codebook response.

Graphically, this comparison is illustrated in FIG. 5. Since ten bit positions are allocated toward the representation of the fixed codebook response of a given sub-frame, the first fixed codebook 52 will have 1024 (2^10=1024) possible pulse sequences to compare to the second residual signal. The comparisons are made and the best matching sequence is determined, then the address of the best matching sequence is considered the FCB bits for the sub-frame, as will be more fully described hereinbelow.

Since only 1,024 various pulse sequences are compared by the first fixed codebook 52, it is important that the sequences be carefully selected, so that as close a match as possible can be found. By the present invention, it has been discovered that the fixed codebook response of a given sub-frame bears a correspondence, or relationship, to the LPC bits, ACB bits, and ACBG bits characterizing that sub-frame. Based upon this discovery, the present invention provides the first fixed codebook shaping unit 51 which generates the possible sequences of the first fixed codebook 52 prior to estimation of the fixed codebook response for the sub-frame.

Figure 6:
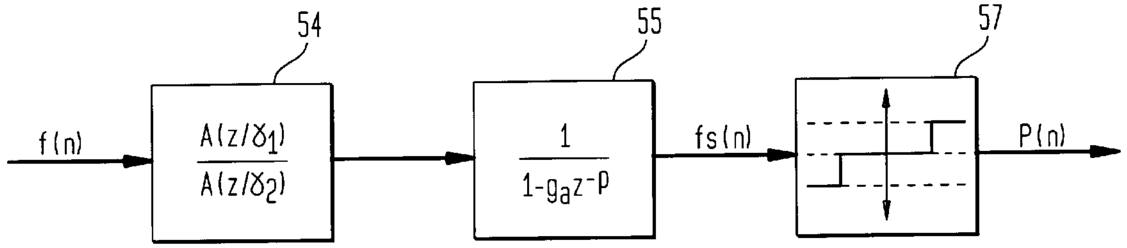
FIG. 6 illustrates a fixed code codebook shaping unit used to arrive of the possible fixed codebook responses.
Figure 7:
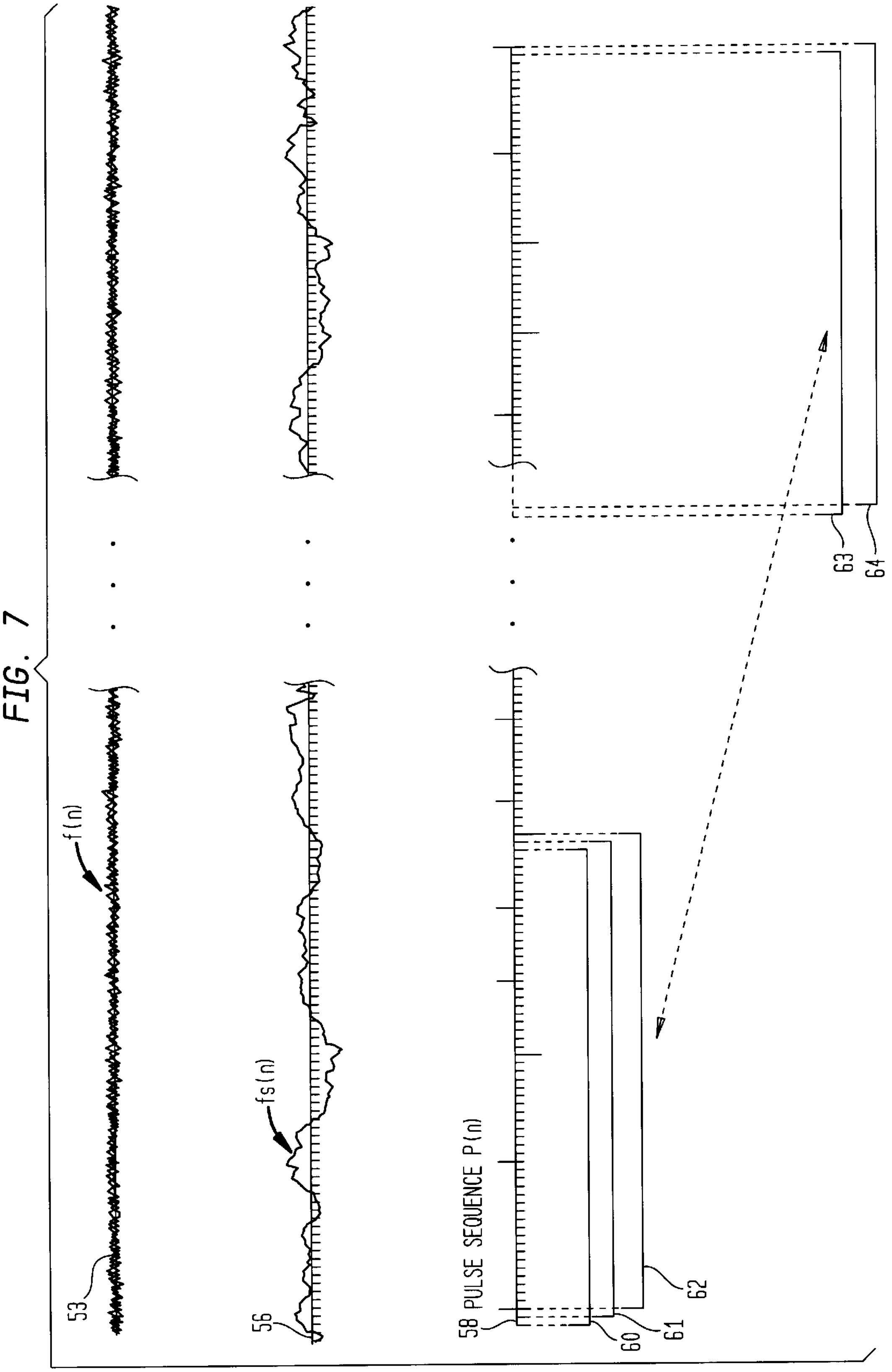
FIG. 7 illustrates various signals associated with the fixed codebook shaping unit.

Now, the operation of the first fixed codebook shaping unit 51 will be described with reference to FIGS. 6 and 7. The first fixed codebook shaping unit 51 has a uniformly distributed, random noise f(n) stored therein, as illustrated on signal line 53. The random noise f(n), such as a Gaussian distributed random noise, has a flat spectrum. The random noise f(n) is passed through a linear predictive (LP) weighing filter 54 and a pitch sharpening filter 55. The filters 54 and 55 are active filters, meaning their operation upon a signal is controlled by inputs. The filters 54 and 55 modify the random noise f(n) to produce an output signal fs(n), as illustrated on signal line 56. The output signal fs(n) has extenuated peaks. In other words, the random noise f(n) has been spectrally shaped by the filters 54 and 55, in accordance with the parameters determined by the LPC filter 2, the first adaptive codebook 6, and the first adaptive codebook gain unit 8.

The operation of the LP weighing filter 54 and the pitch sharpening filter 55 are governed by equations involving the LPC bits, ACB bits, and ACBG bits. The equations are illustrated in FIG. 6, where A(z) represents the output of the LPC filter 2; $g_a$ is the quantitized ACB gain; and P is the pitch lag (as determined by the adaptive codebook 6). In essence, the LP weighing filter 54 is broadening the poles by $\lambda_1$ and $\lambda_2$ factors.

The LP weighing filter 54 and pitch sharpening filter 55 are commonly used filters. The equations and operational characteristics of the filters are known. However, the use of the LP weighing filter 54 and pitch sharpening filter 55 in a combination as disclosed in the present invention is unknown to the art. For more information on the LP weighing filter 54 and pitch sharpening filter 55, reference can be made to textbooks on the subject, such as "Speech Coding and Synthesis," by W. B. Kleijn et al., Elsevier Press, 1995, pp. 89–90.

The output fs(n) of the pitch sharpening filter 55 is passed through a non-linear thresholding filter 57 to arrive at a pulse sequence P(n), as illustrated on signal line 58. The thresholding filter 57 has an adjustable upper threshold and lower threshold. All occurrences of the signal fs(n) between the thresholds are set equal to zero. Occurrences of the signal fs(n) above the upper threshold for a predetermined duration earns a positive pulse 21", and likewise occurrences of the signal fs(n) below the lower threshold for a predetermined duration earns a negative pulse 21".

The sparcity of the pulses 21" can be controlled by the setting of the upper and lower thresholds of the thresholding filter 57. For example, if the thresholds are close together, i.e. close to the zero, many pulses 21" will occur in the pulse sequence P(n). If the thresholds are set relative far apart, i.e. further away from zero, very few pulses 21" will occur in the pulse sequence P(n). By the present invention, it has been determined that the sparcity should preferable be set to in the approximate range of 85% to 93%, meaning that 85% to 90% of the samples should be equal to zero, leaving some four to seven pulses per sub-frame.

Figure 3:
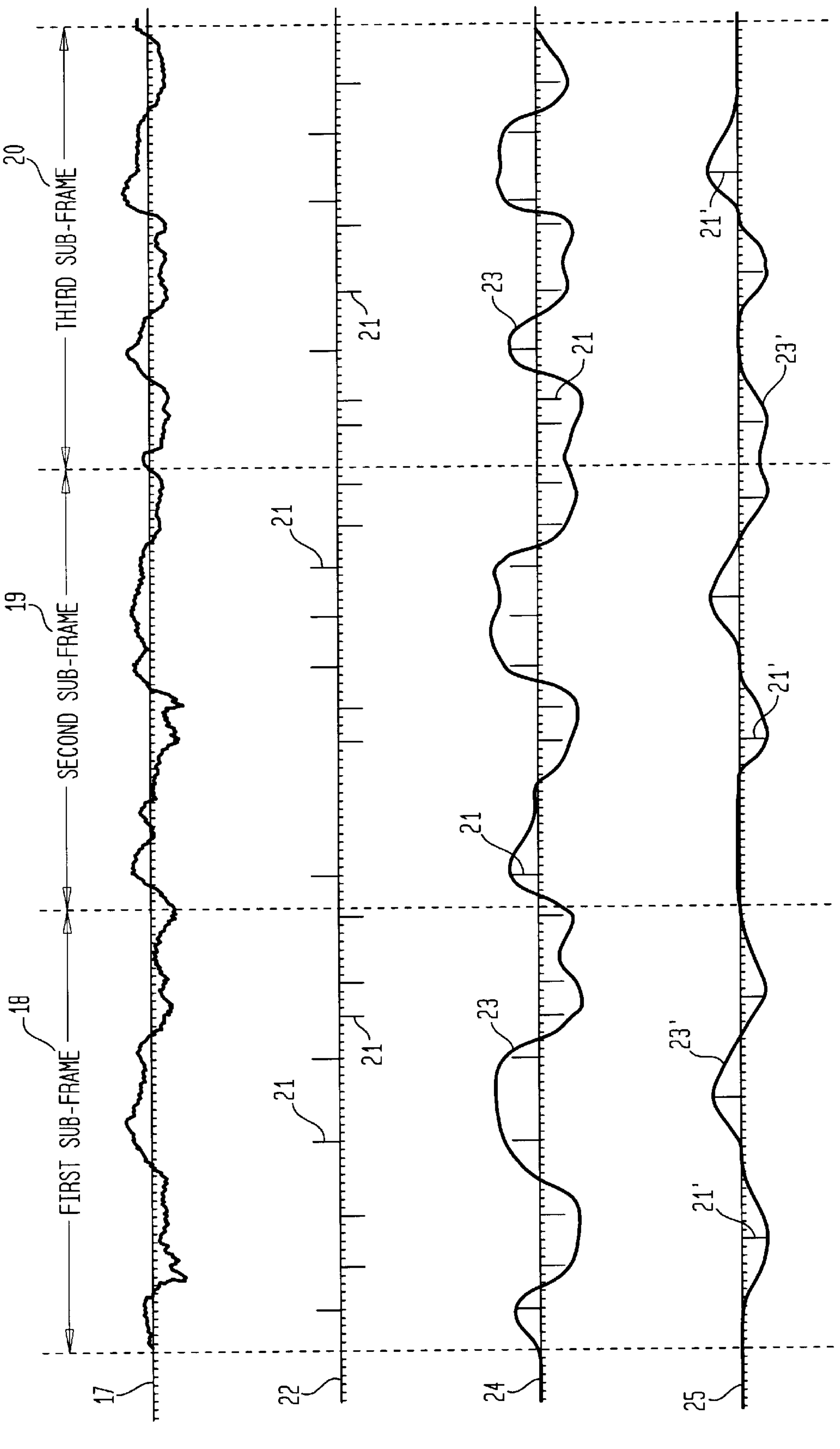
FIG. 3 (BACKGROUND ART)
FIG. 3 illustrates various signals associated with the fixed codebook response, in accordance with the background art.

If the present invention maintains the fifty-three to fifty-four samples per sub-frame, as illustrated in FIG. 3, the random noise f(n), stored in the fixed codebook shaping unit 51, lasts for 54+1024=1078 samples, with 6.7 msec sub-frames this would translate into approximately a 133 msec time duration. The fixed codebook response possibilities are determined by a window (also referred to as a vector), fifty-four samples wide, which is shifted over the pulse sequence P(n).

The zero placement of the window is illustrated by reference numeral 60. The pulse sequence immediately above the window 60 is represented by the indexed entry (0) by the first fixed codebook 52 (See FIG. 5). The first shifted placement of the window is illustrated by reference numeral 61. The pulse sequence immediately above the window 61 is represented by the indexed entry (1) by the first fixed codebook 52. The second shifted placement of the window is illustrated by reference numeral 62. The pulse sequence immediately above the window 62 is represented by the indexed entry (2) by the first fixed codebook 52. The shifting window process is repeated until the last shifted window 63 representing indexed entry (1023) is determined by the first fixed codebook 52.

It would also be possible to have a random noise f(n) with a 2156 sample duration. In this case, the window, or vector, would be shifted in increments of two samples to arrive at the 1,024 possible sequences for the fixed codebook. In fact, it is possible to carry this pattern even further by extending the duration of the random noise and increasing the incremental stepping of the window.

The fixed codebook response for the first sub-frame 18 is determined to be the pulse sequence which best matches the first sub-frame's second residual signal. The index of that entry (which is equates to the number of shifted positions of the window along the pulse sequence P(n)) will be the FCB bits for the first sub-frame 18. Then, new pulse sequences for the first fixed codebook 52 can be formulated and the second sub-frame 19 will have its fixed codebook response determined. Then, new pulse sequences for the first fixed codebook 52 can again be formulated and the third sub-frame 20 will have its fixed codebook response determined.

It should be noted that a variation of the present invention would be to only determine new pulse sequences for the first fixed codebook 52, periodically. For instance, new pulse sequences could be formulated only for each new signal frame, as opposed to each new sub-frame, this is in fact a preferred embodiment of the present invention. Alternatively, new entries could be formulated for every other signal frame, etc. By limiting the reformulation of the fixed codebook's pulse sequences to every signal frame, or every other signal frame, the computations involved are simplified. Further, the reuse of the fixed codebook's pulse sequences is usually sufficiently accuracy in estimating the fixed codebook response, since speech will not tend to significantly vary in the brief time durations involved.

Figure 8:
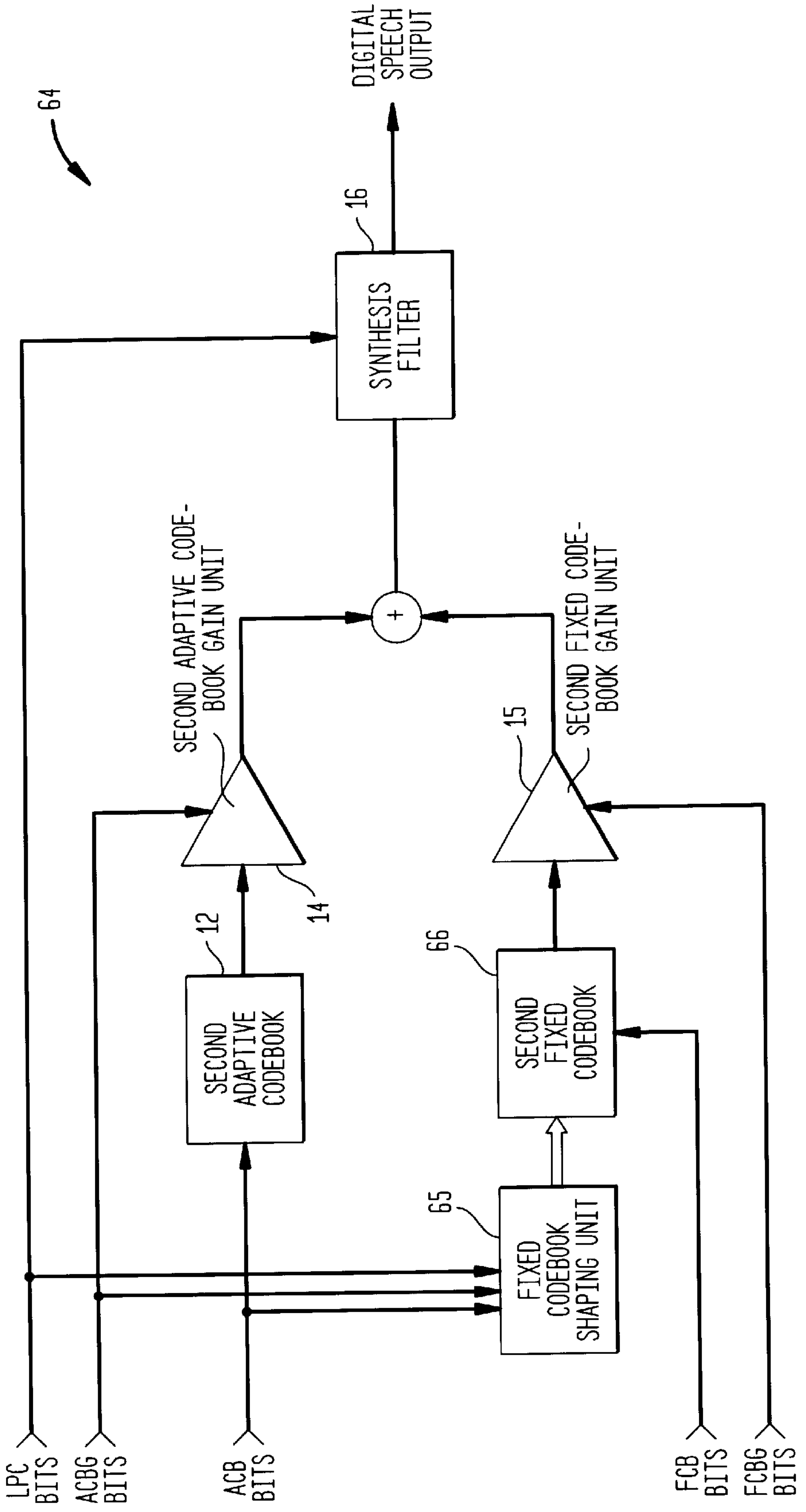
FIG. 8 illustrates a decoding section of a vocoder, in accordance with the present invention.

FIG. 8 illustrates the decoding section of the receiving, second vocoder 64. The second vocoder 64 includes the second adaptive codebook 12, the second adaptive codebook gain unit 14, the second fixed codebook gain unit 15, and the synthesis filter 16. Of particular interest is the second fixed codebook shaping unit 65 and the modified, second fixed codebook 66, in accordance with the present invention.

The operation of the second fixed codebook shaping unit 65 is the same as the first fixed codebook shaping unit 51 of the first vocoder 50. Inside the second fixed codebook shaping unit 65 is stored an identical copy of the random noise f(n), illustrated on signal line 53 of FIG. 7. The second fixed codebook shaping unit 65 includes identical active filters 54 and 55, as well as the identical thresholding filter 57 with the upper and lower thresholds set equal to the upper and lower thresholds of the thresholding filter 57 located in the first fixed codebook shaping unit 51. Therefore, the second fixed codebook shaping unit 65 can generate a pulse sequence P(n) having a sample duration of 1,078 samples, which is identical to the pulse sequence P(n) previously generated in the first fixed codebook shaping unit 51, and illustrated on signal line 58 in FIG. 7.

Figure 1:
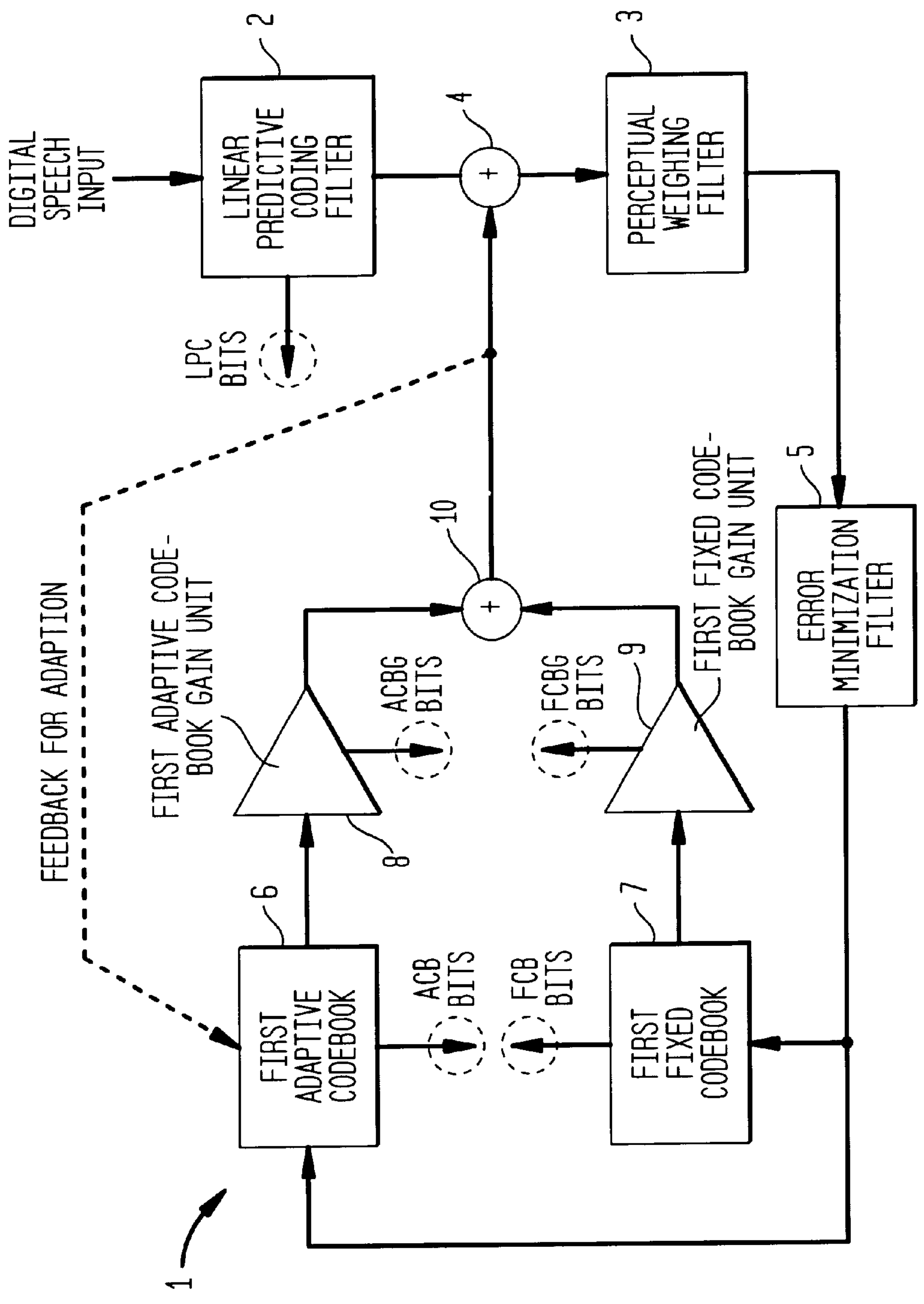
FIG. 1 (BACKGROUND ART)
FIG. 1 illustrates a transmitting vocoder, in accordance with the background art.
Figure 2:
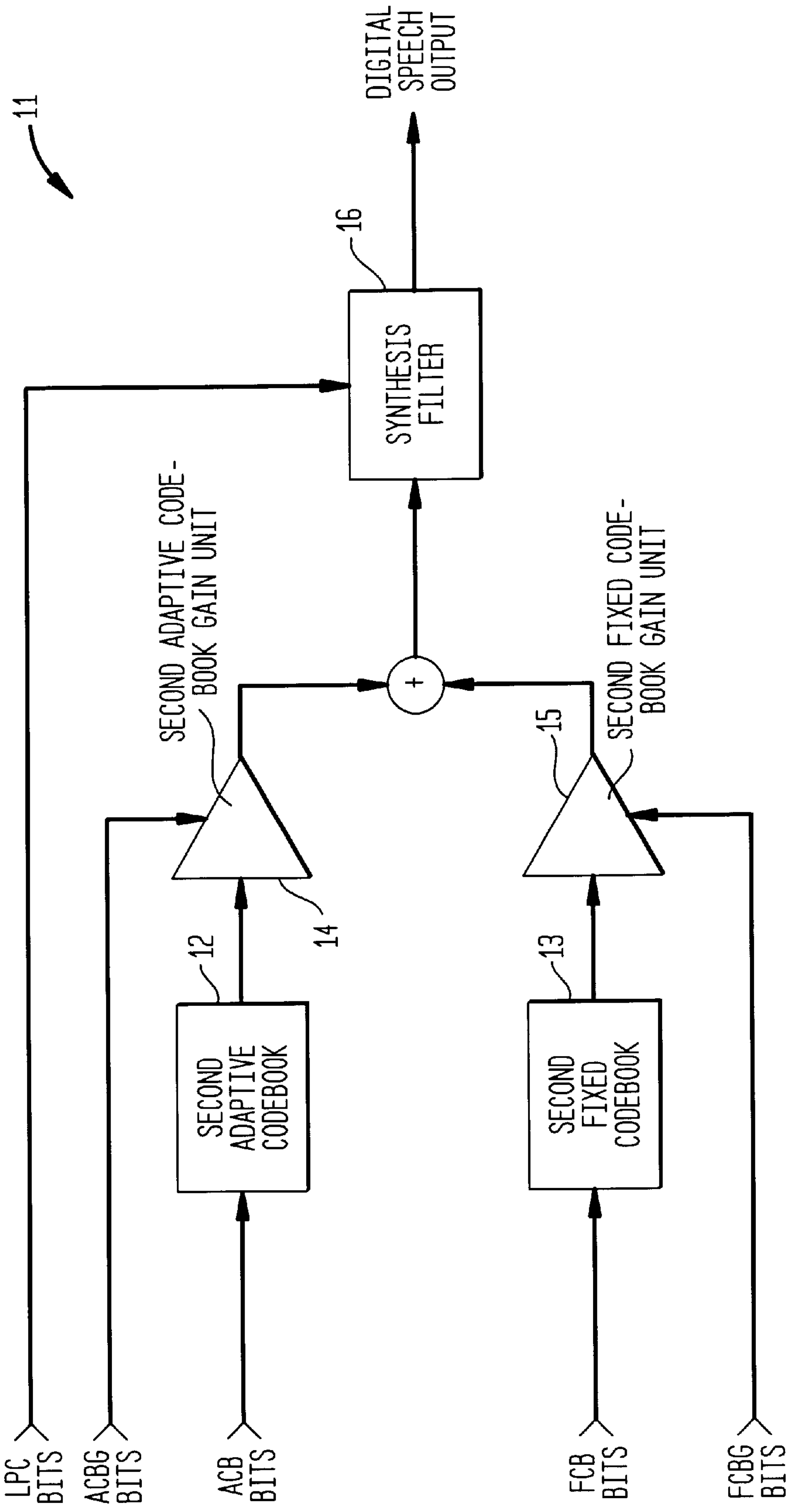
FIG. 2 (BACKGROUND ART)
FIG. 2 illustrates a decoding section of a vocoder, in accordance with the background art.

Once the pulse sequence P(n) is generated, the second fixed codebook 66 can determine the fixed codebook response by shifting a fifty-four sample length window a number of positions along the pulse sequence P(n) equal to the index represented by the FCB bits. The portion of the pulse sequence P(n) located immediately above the shifted window will be the proper estimation of the fixed codebook response determined by the first vocoder 50. All other aspects of the second vocoder's synthesis of the signal frame are in accordance with the background art's decoding vocoder 11, illustrated in FIG. 2.

It should be noted that the pulse sequence entries in the first fixed codebook 52, available to estimate the second residual signal, could each include some four to seven pulses. This is quite an improvement over the background art's three pulses per sub-frame estimation of the second residual signal. This improvement translates into a noticeable improvement in the quality of the reproduced speech.

One important feature of the present invention which allows the placement of the four to seven pulses per sequence in the first fixed codebook 52 is the fact that the pulse sequence P(n), from which the entries are taken, is constructed in accordance with other determined parameters of the signal being modeled. By the present invention, it has been discovered that other determined parameters, such as the LPC parameters, ACB parameters, and ACBG parameters bear a relation, or correlation, to the anticipated fixed codebook response. Therefore, these parameters can be used to shape the pulse sequences available to a limited size, fixed codebook, so that the possible pulse sequences will have a relatively high likelihood of matching the second residual signal when an analysis is performed.

If the pulse sequences, having four to seven pulses, were simply randomly generated, the limited size of the fixed codebook (1024 possible sequences) would statistically be insufficient to provide a suitable matching pulse sequence to the vast majority of the continually varying second residual signals. In other words, if each of the 1024 possible pulse sequences had its four to seven pulses randomly placed along the sequence, the best matching pulse sequence to the second residual signal, as determined by the fixed codebook, would most likely be a poor match, and the reproduced speech for that frame, or sub-frame, or be inaccurate.

It should be noted that it is advantageous that the second vocoder 64 need not receive any extraneous data, in order to reconstruct the pulse sequence P(n) used by the first fixed codebook 52. The LPC bits, ACB bits, and ACBG bits, which are used in the reconstruction of the pulse sequence P(n) were already needed by the second vocoder 64 in order to reconstruct the speech signal, therefore no extraneous data is being included in the bit frames.

Throughout the disclosure and drawings reference has been made to pulses placed at sample points within sub-frames. It should be readily apparent that such illustrations are merely graphical representations of mathematical operations and equations. The graphical representations should simplify the disclosure in presenting the distinctions between the background art and the present invention. In practice, the fixed codebooks 52 and 66, and fixed codebook shaping units 51 and 65 would process the underlying mathematical operations and equations which underlie the graphical representations.

Also, the present invention has illustrated the first and second fixed codebook shaping units 51 and 65 as separate components from the first and second fixed codebooks 52 and 66. The separate illustrations have been made to simplify the presentation of the disclosure. In practice, a fixed codebook shaping unit and a fixed codebook could be incorporated into a single physical component. Further, the other illustrated, "black box" components within the vocoders 50 and 64 may be combined so that one physical component could perform one or more of the tasks or operations associated with several of the illustrated "black box" components. For example, the weighing filter 54 can be combined with the pitch sharpening filter 55 and the thresholding filter 57 to form a single component, accomplishing the operations which have been illustrated separately for purposes of explanation.

While the IS 127 EVRC CDMA coder has been described in the background art for comparison purposes, it should be appreciated that the present invention could be used to improved the performance of any vocoder regardless of the components used in the vocoder and/or the operation of the vocoder. Moreover, while the present invention is particularly useful in improving the performance of a vocoder, when operated at a low bit rate, it should be appreciated that the present invention could be used to improve the estimation accuracy of vocoders operating at medium and high bit rates.

The specific values used in the specification above should not be construed as limiting to the present invention. The specific values have been provided merely to facilitate a complete understanding of one embodiment of the present invention. It should be appreciated that the present invention is beneficial in vocoder's operating at values besides those specifically used in the example of the specification. For instance, signal frames could be longer or shorter than 20 msec in duration. The signal frames could have more or less sub-frames than three, or no sub-frames at all. Any number of samples could be taken in a sub-frame besides fifty-three or fifty-four.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of operating a vocoder comprising:

providing a predetermined signal; receiving an input signal for processing by the vocoder;

extracting at least one parameter characterizing the input signal;

altering the predetermined signal in relation to the extracted at least one parameter to arrive at an altered signal; and determining a portion of the altered signal to represent a fixed codebook response for at least a portion of the input signal.

2. The method according to claim 1, wherein said determining step includes comparing a residual signal of at least a portion of the input signal to various portions of the altered signal and determining which of the various portions best matches the residual signal.

3. The method according to claim 1, wherein the predetermined signal is a Gaussian random noise signal.

4. The method according to claim 1, wherein an indexed location of the portion of the altered signal is characterized by a bit pattern and included in a bit frame representing the input signal.

5. The method according to claim 1, further comprising providing a perceptual weighing filter, and wherein said altering step includes passing the predetermined signal through the perceptual weighing filter.

6. The method according to claim 5, wherein the perceptual weighing filter is an active filter influenced by a linear predictive coding output characterizing at least a portion of the input signal.

7. The method according to claim 1, further comprising providing a pitch sharpening filter, and wherein said altering step includes passing the predetermined signal through the pitch sharpening filter.

8. The method according to claim 7, wherein the pitch sharpening filter is an active filter influenced by an adaptive codebook output and an adaptive codebook gain output, each characterizing at least a portion of the input signal.

9. The method according to claim 1, further comprising the step of filtering the altered signal with a thresholding filter prior to said determining step.

10. The method according to claim 1, further comprising providing a perceptual weighing filter, a pitch sharpening filter, and a thresholding filter, and wherein said altering step includes passing the predetermined signal through the perceptual weighing filter, the pitch sharpening filter, and the thresholding filter.

11. The method according to claim 1, wherein the at least one parameter is represented by linear predictive coding bits.

12. The method according to claim 1, wherein the at least one parameter is represented by adaptive codebook bits.

13. The method according to claim 1, wherein the at least one parameter is represented by adaptive codebook gain bits.

14. The method according to claim 1, wherein the at least one parameter is selected from a group comprising at least a parameter represented by linear predictive coding bits, adaptive codebook bits, and adaptive codebook gain bits.

15. A method of operating a vocoder comprising:

receiving a bit frame for processing by the vocoder;

altering a predetermined signal in relation to first bits within the frame to arrive at an altered signal;

indexing a portion of the altered signal using second bits within the frame; and determining the indexed portion to represent a fixed codebook response for at least a portion of the bit frame.

16. The method according to claim 15, wherein the first bits represent a linear predictive coding response for at least a portion of the bit frame.

17. The method according to claim 15, wherein the first bits represent a linear predictive coding response, an adaptive codebook response, and an adaptive codebook gain response for at least a portion of the bit frame.

18. The method according to claim 15, wherein the indexed portion is a pulse sequence.

19. The method according to claim 18, wherein the pulse sequence includes a plurality of zero entries and a plurality of pulse entries, and the ratio of zero entries to pulse entries is in the range of 85 to 95 percent.

20. The method according to claim 15, wherein said bit frame include subframes, and the indexed portion is representative of a fixed codebook response for one of the sub-frames of the bit frame.

* * * * *